US012546864B2

(12) United States Patent
Henkel et al.

(10) Patent No.: US 12,546,864 B2
(45) Date of Patent: Feb. 10, 2026

(54) LASER SCANNER

(71) Applicant: SICK AG, Waldkirch (DE)

(72) Inventors: Olaf Henkel, Waldkirch (DE); Hans-Jürgen Kammer, Waldkirch (DE); Carsten Natzkowski, Waldkirch (DE)

(73) Assignee: SICK AG, Waldkirch (DE)

( * ) Notice: Subject to any disclaimer, the term of this patent is extended or adjusted under 35 U.S.C. 154(b) by 1034 days.

(21) Appl. No.: 17/671,098

(22) Filed: Feb. 14, 2022

(65) Prior Publication Data

US 2022/0260683 A1     Aug. 18, 2022

(30) Foreign Application Priority Data

Feb. 16, 2021   (DE) .......................... 102021103624.0

(51) Int. Cl.
*G01S 7/481* (2006.01)
*G01S 13/04* (2006.01)
(52) U.S. Cl.
CPC .......... *G01S 7/4813* (2013.01); *G01S 7/4817* (2013.01); *G01S 13/04* (2013.01)
(58) Field of Classification Search
CPC ............................. G01S 7/4812; G01S 7/4815
See application file for complete search history.

(56) References Cited

U.S. PATENT DOCUMENTS

| 2004/0233491 A1* | 11/2004 | Schanz | G01S 7/4813 |
| | | | 359/211.2 |
| 2004/0240020 A1* | 12/2004 | Schanz | G01S 7/4817 |
| | | | 359/211.2 |
| 2006/0087640 A1* | 4/2006 | Yamaguchi | G01S 7/4911 |
| | | | 356/614 |
| 2014/0285818 A1* | 9/2014 | Holz | G01S 17/36 |
| | | | 356/614 |
| 2017/0356740 A1* | 12/2017 | Ansari | H05B 47/155 |
| 2018/0143012 A1* | 5/2018 | Ansari | G01S 7/4815 |
| 2020/0309910 A1* | 10/2020 | McCord | G01S 17/08 |
| 2021/0018599 A1* | 1/2021 | Lu | G01S 17/42 |

(Continued)

FOREIGN PATENT DOCUMENTS

| DE | 102011005740 A1 | 9/2012 |
| DE | 202012007402 U1 | 12/2013 |

(Continued)

*Primary Examiner* — Shawn Decenzo
(74) *Attorney, Agent, or Firm* — Nath, Goldberg & Meyer; Jerald L. Meyer; Illrian Durri

(57) ABSTRACT

A laser scanner having a plurality of light transmitters, a plurality of light receivers and a control and evaluation unit, wherein a plurality of light transmitters and a plurality of light receivers are respectively arranged in the form of a segment of a circle, in arcuate form, or along a curved line in a common housing, wherein the light beams are transmitted and received in the manner of a fan in different angular directions through a convex front screen at an outer side of the housing, wherein the distances of the transmitted light beams of the light transmitters increase as the distance from the laser scanner increases and/or the distances of the received light beams of the light receivers decrease as the distance from the laser scanner decreases and wherein the light receivers are configured to respectively form a linear reception zone.

10 Claims, 12 Drawing Sheets

(56) References Cited

U.S. PATENT DOCUMENTS

| | | | | |
|---|---|---|---|---|
| 2022/0163637 A1* | 5/2022 | Kim | ................... | G01S 7/4817 |
| 2022/0163788 A1* | 5/2022 | Horiguchi | ............ | G01S 7/4815 |
| 2023/0137192 A1* | 5/2023 | Liang | .................. | G01S 17/894 |
| | | | | 356/4.01 |
| 2024/0192373 A1* | 6/2024 | Harrold | ................ | G01S 7/4816 |

FOREIGN PATENT DOCUMENTS

| | | |
|---|---|---|
| DE | 102018129972 A1 | 5/2020 |
| EP | 2910970 B1 | 2/2016 |

* cited by examiner

LASER SCANNER

The present invention relates to a laser scanner.

Such a laser scanner is known from EP 2 910 970 B1.

Such a laser scanner is also known from DE 10 2018 129 972 A1.

It is an object of the invention to provide an improved laser scanner.

The object is satisfied by a laser scanner having a plurality of light transmitters and a plurality of light receivers and a control and evaluation unit for evaluating the time of flight of light beams from light transmitters via an object to light receivers, wherein a plurality of light transmitters and a plurality of light receivers are respectively arranged in the form of a segment of a circle, in arcuate form, or along a curved line in a common housing, wherein the light beams are transmitted and received in the manner of a fan in different angular directions through a convex front screen at an outer side of the housing, wherein the distances of the transmitted light beams of the light transmitters increase as the distance from the laser scanner increases and/or the distances of the received light beams of the light receivers decrease as the distance from the laser scanner decreases, wherein the optical axes of the light transmitters and light receivers are spaced apart from one another, wherein the light transmitters are configured to respectively generate an illumination line, and wherein the light receivers are configured to respectively form a linear reception zone.

The laser scanner in accordance with the invention advantageously does not require any mechanically movable parts. The laser scanner is thus robust with respect to negative mechanical environmental influences and has a high service life due to a lack of mechanical wear.

A protected field is formed in a monitored zone and the protected field is monitored by the laser scanner. At least one object can in particular be detected in the protected field. For this purpose, the time of flight is evaluated that the light requires from the transmission of the light transmitter via a reflection at an object back to the light receiver.

Different evaluation processes are possible for the evaluation of the time of flight. A known method for optical distance detection is the time of flight measurement. A distinction is made between pulse-based measurement and phase-based measurement. In a pulse time of flight process, a brief light pulse is transmitted and the time up to the reception of the returning light pulse is measured. Alternatively, in a phase process, transmitted light is amplitude modulated and a phase shift between the transmitted light and the received light is determined, with the phase shift likewise being a measure for the time of flight. The time of flight is then converted into a distance via the speed of light.

One challenge in the time of flight measurement is the robust detection of even small useful light levels. Avalanche photodiodes (APDs) are used for this purpose for example. The incident light here triggers a controlled avalanche effect. The charge carriers generated by incident photons are thereby multiplied and a photocurrent is produced that is proportional to the received light intensity, but that is in this respect substantially larger than with a simple PIN diode.

The light receivers and/or the control and evaluation unit is/are preferably configured to receive a light signal respectively after one another by a light reception element. The light receiver is therefore operated sequentially, for example, analogously to a previous laser scanner in accordance with the prior art. Light receivers or light reception elements that are each just not next in line are preferably not only not read, but are also switched inactive to reduce extraneous light influences, for example.

The laser scanner has a plurality of light transmitters to transmit a light signal into the monitored zone. The light signal is preferably modulated to enable a time of flight measurement, in particular in that light pulses are generated that are reflected at least in part by a respective sensed object and then return as remitted light pulses.

In accordance with the invention, each of the light transmitters respectively generates a light line in the monitored zone. A corresponding transmission optics can be used for this purpose, for example having a cylindrical lens, an arrangement of microcylindrical lenses, a diffractive optical element, or the like.

In a further development of the invention, the light receivers have a reception array of reception elements.

An illumination line or light line is particularly suitable in connection with an at least linear arrangement of the light reception elements of the light receiver in the same direction as the illumination line.

The light transmitters are configured to linearly illuminate the monitored zone observed by the light receiver. It is therefore a very narrow area illumination or with a light line, a linear illumination. The light transmitters are configured, for example, to respectively only illuminate a part zone of the monitored zone sequentially. The part zone preferably just corresponds to the detection zone or to a part detection zone of a light receiver; however, provision is also made to irradiate it more or less clearly or to impact a plurality of light reception elements in a targeted manner. Associations of light transmitters and light receivers or light reception elements are produced that can be switched through sequentially.

The control and evaluation unit is configured to determine a time of flight of light signal that is transmitted and then received again using a received signal. Light pulses are preferably generated and a pulse-based or direct time of light process is thus used, The control and evaluation unit converts the time of flight, that is itself already a measure of the distance in unusual units, as required via the constant speed of light into a metric distance, for example.

The control and evaluation unit preferably has at least one TDC (time to digital converter) for the time of flight measurement. It is a known and relatively simple component that can measure times of flight with a high temporal resolution. TDCs can be directly monolithically integrated in a crystal of the light receiver. A TDC can practically work as a stopwatch that is started at the transmission time of a light pulse and is stopped at the reception time by the received remitted light pulse. Conversely, it is also conceivable that the reception of a remitted light pulse starts the time measurement that is then stopped again at a fixed time reference. This has advantages in some implementations and the constant time offset between the transmission time and the fixed time reference can be subsequently compensated by calculation.

The control and evaluation unit preferably has a plurality of time of flight measurement units, in particular TDCs. These time of flight measurement units are each associated with a light reception element to enable a spatially resolved distance measurement via the light receiver. There can also be fewer time of flight measurement units than light reception units in that a region of interest is selected. The association of the time of flight measurement units can be fixed or variable, the latter in particular in that the time of flight measurement units are connected to different light receivers in a time-offset manner. It is conversely also possible to use a plurality of time of flight measurement units for the same light reception element.

A front screen of the laser scanner is arranged in the housing here. The front screen here forms a convex surface at the outer side of the housing. The transmitted light beams are transmitted in the manner of a fan here. The front screen is, for example, arranged at an angle of 75° to 105°, in particular at an angle of 80° to 100°, and very particularly at an angle of 90°, with respect to a center axis or optical axis of the light receivers or light transmitters. A portion of light is thereby reduced that is reflected at the front screen.

In accordance with the invention, the light beams are transmitted or received in the manner of a fan in different angular directions, whereby a monitored zone can be simply examined as to whether objects are present in the monitored zone or not and at which point, i.e. at which distance, the objects are present. The objects can furthermore be measured or a surrounding contour and its change can be detected. The monitored zone is monitored within a fan-like plane by the fan-Ike transmission of the light beams or by the fan-like reception. The transmission elements or reception elements are arranged, for example, radially symmetrically approximately in the periphery of a cylinder The laser scanner can be produced with high angular precision since the transmission elements and reception elements are firmly fixed and the light beams enter into the monitored zone directly without moving parts. The angular precision of the angular directions can be checked and set in the production of the laser scanner. It is thereby ensured that every laser scanner observes a specific required minimum angular precision.

The laser scanner in accordance with the invention therefore has a simple and inexpensive design. Since the laser scanner manages without any mechanically moving parts, it has no mechanical wear and has a long service life. A required duration of use of, for example, approximately 20 years can be satisfied with the laser scanner in accordance with the invention, for example.

Sine the laser scanner manages without any moving parts that can be exposed to accelerations on a use in vehicles, for example, the laser scanner in accordance with the invention is less sensitive to vibration and shock loads and can therefore be used without problem in mechanically moved objects such as vehicles, in particular forklift trucks. Since the laser scanner manages without any movable parts, the laser scanner can also have a very compact design.

In a further development of the invention, a respective deflection prism is associated with each light transmitter and/or with each light receiver, with the light beams being deflected on the basis of total reflection.

In accordance with the further development, at least one deflection optics. for example, comprises a deflection prism having a boundary surface whose surface normal has an angle of inclination to the main sensor direction, said angle of inclination amounting to half the deflection angle.

Such a deflection prism can in the simplest case be implemented by a body comprising e.g. a plastic and having the cross-section of an isosceles and right angle triangle, with the two surfaces that stand perpendicular on one another forming the entry and exit surfaces. The third surface serves as a reflective boundary surface, with incident light at an angle that is greater than the boundary angle of the total reflection being totally reflected. An advantage of the total reflection at a metal layer comprises no energy losses occurring in the ideal case. In addition, no complex coating processes are required for the production of a totally reflective deflection prism. Under ideal conditions the beam deflection is furthermore comparatively insensitive toward slight tilts of the prism such as occur as a consequence of installation tolerances due to total reflection. I.e. a maladjustment of the prism within the sensor housing generally only has a small effect on the operation of the optical beam deflection. The deflection prism can therefore be slightly displaced, rotated, or tilted with respect to the transmitter or the receiver without any substantial restriction of the deflection function occurring.

High demands are consequently not made on the positioning of the prism, whereby the manufacture of the optoelectronic sensor can take place particularly economically. A further use of the prism comprises unwanted reflections at tube walls or lens walls being at least partly decoupled since the total reflection only occurs within a specific angular range.

In accordance with an aspect of the invention, the light passage surface is a surface standing perpendicular on the optical axes of the transmitter and of the receiver so that the boundary surface of the prism forms an angle with the light passage surface that amounts to half the deflection angle.

In a further development of the invention, the deflection prism has at least one integrated lens, whereby a single-piece prism lens body is formed.

At least one of the deflection optics or one of the deflection prisms is thus formed exclusively by a prism. In other words, with this deflection prism, no further optical components are present for the beam deflection except for the prism. The manufacturing costs of the sensor can thus be kept particularly low.

The integrated lens is preferably a converging lens.

In a further development of the invention, the integrated lens of the deflection prism is a free-form lens.

The beam guidance can thus be individually set. The free-form lens has an optically effective free-form surface here. An individual beam guidance or bundling can thus be implemented.

In a further development of the invention, the light transmitter, the light receiver, and the respective associated prisms are arranged in a common holding device, with the holding device for the transmission light path and for the reception light path each forming optically separate tubes, with a plurality of holding devices being arranged in the form of a segment of a circle, in arcuate form, or along a curved line in a common housing.

The holding device forms a mechanically fixed arrangement of light transmitters and light receivers. The holding device here forms respective tubes for the transmission light path and for the reception light path. These paths are optically separated by the holding device so that the transmitted transmission light cannot influence the received reception light.

In a further development of the invention, a converging lens is arranged between the reception array and the prism of the light receiver. The light can thereby be focused on the reception array after exiting the deflection prism. The focusing can in particular be set independently by the converging lens if different receiver arrays are used from a construction aspect with an identical prism.

In a further development of the invention, the reception elements of the reception array are each single-photon avalanche diodes.

An even greater sensitivity is achieved with avalanche photodiodes that are operated in the so-called Geiger mode (SPADs, single-photon avalanche diodes). In this respect, the avalanche photodiode is biased above the breakdown voltage such that a single charge carrier released by a single photon can already trigger an avalanche that is no longer controlled and that then recruits all the available charger carriers due to the high field strength. The avalanche then comes to a halt (passive quenching) and is no longer available for the detection for a certain dead time. It is alternatively also known to recognize and quench the avalanche from the outside (active quenching).

A SPAD thus counts single incidents like a Geiger counter. SPADs are not only highly sensitive, but are also comparatively inexpensive and can be efficiently integrated in silicon semiconductors. The fact is a special feature that a minimal interference event such as an external light photon or dark noise also generates the same maximum received signal as a useful light signal. To combat these effects, a plurality of SPADs are evaluated together in practice.

The light receivers and/or the control and evaluation unit is/are preferably configured to receive a light signal respectively after one another by a light reception element. The light receiver is therefore operated sequentially, analogously to a laser scanner. Light receivers or light reception elements that are each just not next in line are preferably not only not read, but are also switched inactive. This is possible with SPADs in that the bias voltage is lowered to below the breakdown voltage. Extraneous light events or dark events thereby also do not occur by which the light reception element is still in dead time when it is then switched active. In addition, it reduces the power consumption of the light receiver.

It is conversely also possible to use a plurality of time of flight measurement units for the same light reception element. This is particularly sensible in the case of SPADs because a light reception element then preferably has a plurality of SPADs as subpixels. These SPADs can then deliver a plurality of times of flight per light reception element individually or group-wise. The evaluation of such SPADs acting as subpixels is, however, also conceivable together with only one time of flight measurement unit by means of a summarizing logic. This is an OR logic, for example, a summation, or a coincidence logic that only reacts to filter individualized interference events when a minimum number of SPADs triggers an avalanche in a very narrow time window.

The control and evaluation unit is preferably configured to measure times of flight multiple times by measurement repetition and/or separate evaluation of a plurality of received signals of a light reception element. Each distance value is then based on a plurality of individual measurements, which in particular produces better measurement results in the case of large ranges, high extraneous light loads, and a generally poor signal-to-noise ratio. Measurement repetition means that a further light pulse is transmitted and received again. Additional time of flight measurements cannot only be acquired over time, but also in that the individual light reception elements have a plurality of subpixels from which received signals of a plurality of times of flight can be determined. This multiple evaluation should not be confused with the respective evaluation of the light reception elements that additionally takes place for a spatial resolution over the light receivers. It is here a question of acquiring a plurality of measured values for the time of flight for the same location with the aid of subpixels. The measurement accuracy is also very generally increased by multiple measurement; however, this is particularly advantageous with SPADs because individual measurements can be due to a dark or extraneous light event and thus not only deviate by a certain noise tolerance, as with other light reception elements, but also do not correspond to the desired time of flight at all.

The control and evaluation unit is preferably configured to accumulate a plurality of measured times of flight in a histogram in whose bins a count is made of how often a time of flight was measured in a specific time of flight range. The histogram divides the time of flight range of interest from zero up to the maximum range or a partial range thereof in preferably uniform bins and counts how often a time of flight respectively occurring in the bin was measured. The width of the bins is inter alia selected with reference to the desired temporal resolution and the memory present. The plurality of times of flight arise over time by measurement repetition with a respective further transmitted light pulse and/or by the multiple evaluation of subpixels of a light reception element. Statistical evaluations of the multiple measurement for determining a more exact time of flight is simply possible with a histogram.

In a further development of the invention, a partial selection of reception elements of the reception array are combined to form contiguous evaluation groups, with only the evaluation groups for evaluating a time of flight and for generating an object determination signal being used.

Four rectangular evaluation groups that are arranged in a row are formed, for example.

In a further development of the invention, a respective light transmitter and a respective light receiver are arranged spaced apart from one another so that a triangulation arrangement is formed, with only some of the reflected light of an object being incident on the light receiver and/or on the evaluation groups in a near field.

The intensity normally increases quadratically the smaller the distance is between the object and the light receiver. To prevent the light receiver from being overcontrolled, the optics of the light receiver is adapted such that the reflection of the illumination line is not completely imaged on the light receiver or on the reception array and/or on the evaluation groups at small object distances. This is due to the fact that the transmitted beam of the light transmitter runs offset from the received beam. Provision is furthermore made, for example, that the object is also imaged a little "blurred" at small distances, whereby the intensity of the received light on the light receiver is further reduced.

Since all the light is not incident on the active surface of the light receiver in the near zone, that is not on all the pixels of the reception array that are actually evaluated, the intensity range on the light receiver is reduced.

The measurement accuracy is thereby increased as long as the light receiver or the evaluation disposed downstream, for example a TDC or a counter behind the TDCS, is not overcontrolled. A "clipping" that is a cutting off of the effective light cone is therefore prevented.

If the object is close or is in a near zone of the light receiver, the signal intensity at the receiver would be too high and "clipping" would occur, whereby a measurement error would be caused in the distance measurement.

The signal intensity is reduced at small distances between the TOF transceiver and the measured object. The dynamic range the TOF sensor has to be able to read is thereby reduced. If the "clipping" is reduced, the measurement accuracy is better.

Particularly with applications in safety engineering, a high measurement accuracy in the total protected field is important since the safety distance has to be expanded by the maximum measurement error to be assumed to ensure that a machine or an autonomous vehicle initiates a safety measure in good time before a person is injured. The same applies to collisions with other machines. Maximum productivity is achieved in an industrial plant when a machine, an autonomous vehicle, or a mobile robot has a protected field that is as small as possible since the larger the protected field, the earlier the autonomous vehicle has e.g. to brake.

The autonomous vehicle additionally then needs more space. This in turn limits the maximum number of autonomous vehicles that can simultaneously operate in a specific zone without constantly having to brake one another.

With a stationary plant, a larger protected field also causes a larger zone that the hazardous machine takes up on a factory floor that cannot be otherwise used. This increases the costs since it reduces the maximum number of machines that can be set up on the factory floor.

An increase in the measurement accuracy in a safety application thus enables a smaller protected field and this in turn enables higher productivity of the machine and/or plant.

The optical "centers" of the transmitted and received beams are not concentric, for example. Instead, the distance of the two axes from one another and/or the angle to one another and the focal length of the optical lenses are selected, for example, such that objects located in the near zone of the sensor are only partly imaged on the part of the active surface of the SPAD array and are actively read. The setting of the focal length can be set particularly simply or exactly via the use of the deflection prisms or the deflection prisms in the optical path. The prisms are adjustable, for example, in a further development of the invention.

For example, only a part, in particular a small part, of the active surface of the TOF chip or of the reception array is read during the distance measurement. I.e. an object in the near zone is not necessarily imaged outside the optically active surface of the SPAD chip. It is sufficient if some of the photons are incident on the SPADs that are not read at this point. The size of the optically illuminated surface of the light transmitter and of the active pixels on the SAPD reception array thus also has an influence on this effect.

A measurement of the environmental light is provided in a further development of the invention.

The light receiver or part regions of the SPAD receiver array already start to measure earlier than the light needs to arrive. I.e. the SPADs or single-photon avalanche diodes are switched active briefly before the 1st photon of the transmitted pulse has reached the receiver. Only environmental light and/or light from light transmitters of the same design can therefore arrive at the selected part zone or zones in this time. The light intensity is evaluated. If it is too high, the sensor switches into an error state since too much environmental light results in a dazzling of the sensor so that no SPADs or single-photon avalanche diodes remain to detect the photons that are reflected from the object to be measured.

A so-called pile-up effect is evaluated in a further development of the invention.

A measurement accuracy is thereby increased since the error that the extraneous light causes is thus reduced.

A single-photon avalanche diode or a SPAD can be activated only once per measurement cycle. If environmental light distributed homogeneously in time is incident on the light receiver, it slowly activates all the SPADs. This error is similar to a decaying e function and is removed from a formed histogram by calculation before a filter of the control and evaluation unit is used by which the data are treated such that the distance from the first object in the protected field can be sought by a maximum search.

The correction takes place in that the values in the histogram are multiplied in dependence on their time order by an inverse e function whose parameters were fixed by experiment, for example.

Because the function is an inverse e function, its effect is disproportionately large in the front region of the histogram. That is exactly where the effect by the accidentally activated SPADs is the greatest. The effect and the correction by the function is smaller further to the rear, that is later in time after the start of an individual measurement.

In a further development of the invention, reception elements are evaluated on which no transmitted light is incident.

It is thus ensured that an addressing of the pixels works properly.

The SPADs, single-photon avalanche diodes, or pixels of the reception array are read that are not read during normal reception operation, that is, for example, pixels that are arranged around the active reception zone. These pixels are evaluated, and indeed in a time period in which the light transmitter, in particular a laser, is just not activated. The control and evaluation unit has the expectation that the SPADs in this zone are not activated since they are actually not illuminated. If a signal nevertheless arrives here, the control and evaluation unit knows that something is wrong with the addressing of the pixels, that is the control and evaluation unit reads incorrect pixels. If this is the case, the control and evaluation unit switches into an error state. The light transmitter is switched off at this time.

The invention will also be explained in the following with respect to further advantages and features with reference to the enclosed drawing and to embodiments. The Figures of the drawing show in:

FIG. 1 a laser scanner comprising a formed protected field;

FIG. 2 a respective light transmitter and light receiver of a laser scanner;

FIG. 3 a light transmitter and a formed illumination line;

FIG. 4 a light receiver with a linear reception zone;

FIG. 5 a laser scanner comprising a formed protected field;

FIG. 6 a protected field;

FIG. 7 a deflection prism, a converging lens, and a reception array;

FIG. 8 a deflection prism and a light transmitter;

FIG. 9 a holding device;

FIG. 10 a holding device with deflection prisms;

FIG. 11 a light transmitter, a light receiver, and an object;

FIG. 12 a reception array;

FIGS. 13 and 14 respectively an autonomous vehicle; and

FIG. 15: a histogram.

In the following Figures, identical parts are provided with identical reference numerals.

FIG. 1 shows a laser scanner 1 having a plurality of light transmitters 2 and a plurality of light receivers 3 and a control and evaluation unit 4 for evaluating the time of flight of light beams from light transmitters 2 via an object 5 to light receivers 3, wherein a plurality of light transmitters 2 and a plurality of light receivers 3 are respectively arranged in the form of a segment of a circle, in arcuate form, or along a curved line in a common housing 6, wherein the light beams are transmitted and received in the manner of a fan in different angular directions through a convex front screen 7 at an outer side of the housing 6, wherein the distances of the transmitted light beams of the light transmitters 2 increase as the distance from the laser scanner 1 increases and/or the distances of the received light beams of the light receivers 3 decrease as the distance from the laser scanner 1 decreases, wherein the optical axes of the light transmitters 2 and light receivers 3 are spaced apart from one another, wherein the light transmitters 2 are configured to respectively generate an illumination line, and wherein the light receivers are configured to respectively form a linear reception zone.

A protected field 12 is formed in a monitored zone and the protected field 12 is monitored by the laser scanner 1. At least one object 5 can in particular be detected in the protected field 12. For this purpose, the time of flight is evaluated that the light requires from the transmission of the light transmitter 2 via a reflection at an object 5 back to the light receiver 3, The laser scanner 1 has a plurality of light transmitters 2 to transmit a light signal into the monitored zone. The light signal is preferably modulated to enable a time of flight measurement, in particular in that light pulses are generated that are reflected at least in part by a respective sensed object 5 and then return as remitted light pulses.

In accordance with FIG. 1, each of the light transmitters 2 respectively generates a light line in the monitored zone. A corresponding transmission optics can be used for this purpose, for example having a cylindrical lens, an arrangement of microcylindrical lenses, a diffractive optical element, or the like.

Figure 12:
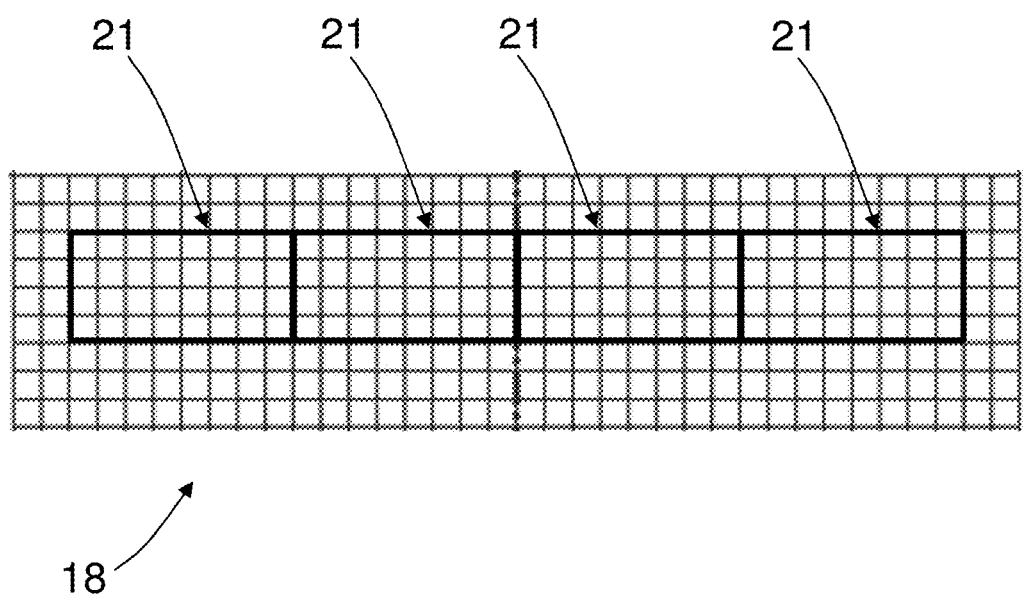

In accordance with FIG. 12, for example, the light receiver 3 has a reception array 18 of reception elements.

An illumination line 9 or light line is particularly suitable in interaction with an at least linear arrangement of the light reception elements of the light receiver in the same direction as the illumination line 9.

The light transmitters 2 are configured to linearly illuminate the monitored zone observed by the light receiver 3. It is therefore a very narrow area illumination or, with a light line, a linear illumination. The light transmitters 2 are configured, for example, to respectively only illuminate a part zone of the monitored zone sequentially. The part zone preferably just corresponds to the detection zone or to a part detection zone of a light receiver 3; however, provision is also made to irradiate it more or less clearly or to impact a plurality of light reception elements in a targeted manner. Associations of light transmitters 2 and light receivers 3 or light reception elements are produced that can be switched through sequentially.

The control and evaluation unit 4 is configured to determine a time of flight of a light signal that is transmitted and then received again using a received signal. Light pulses are preferably generated and a pulse-based or direct time of light process is thus used, The control and evaluation unit 4 converts the time of flight, that is itself already a measure of the distance in unusual units, as required via the constant speed of light into a metric distance, for example.

The control and evaluation unit 4 preferably has at least one TDC (time to digital converter) 23 for the time of flight measurement. It is a known and relatively simple component that can measure times of flight with a high temporal resolution. TDCs 23 can be directly monolithically integrated in a crystal of the light receiver. A TDC 23 can practically work as a stopwatch that is started at the transmission time of a light pulse and is stopped at the reception time by the received remitted light pulse.

A front screen 7 of the laser scanner 1 is arranged in the housing 6 here. The front screen 7 here forms a convex surface at the outer side of the housing 6. The transmitted light beams are transmitted in the manner of a fan here.

Figure 1:
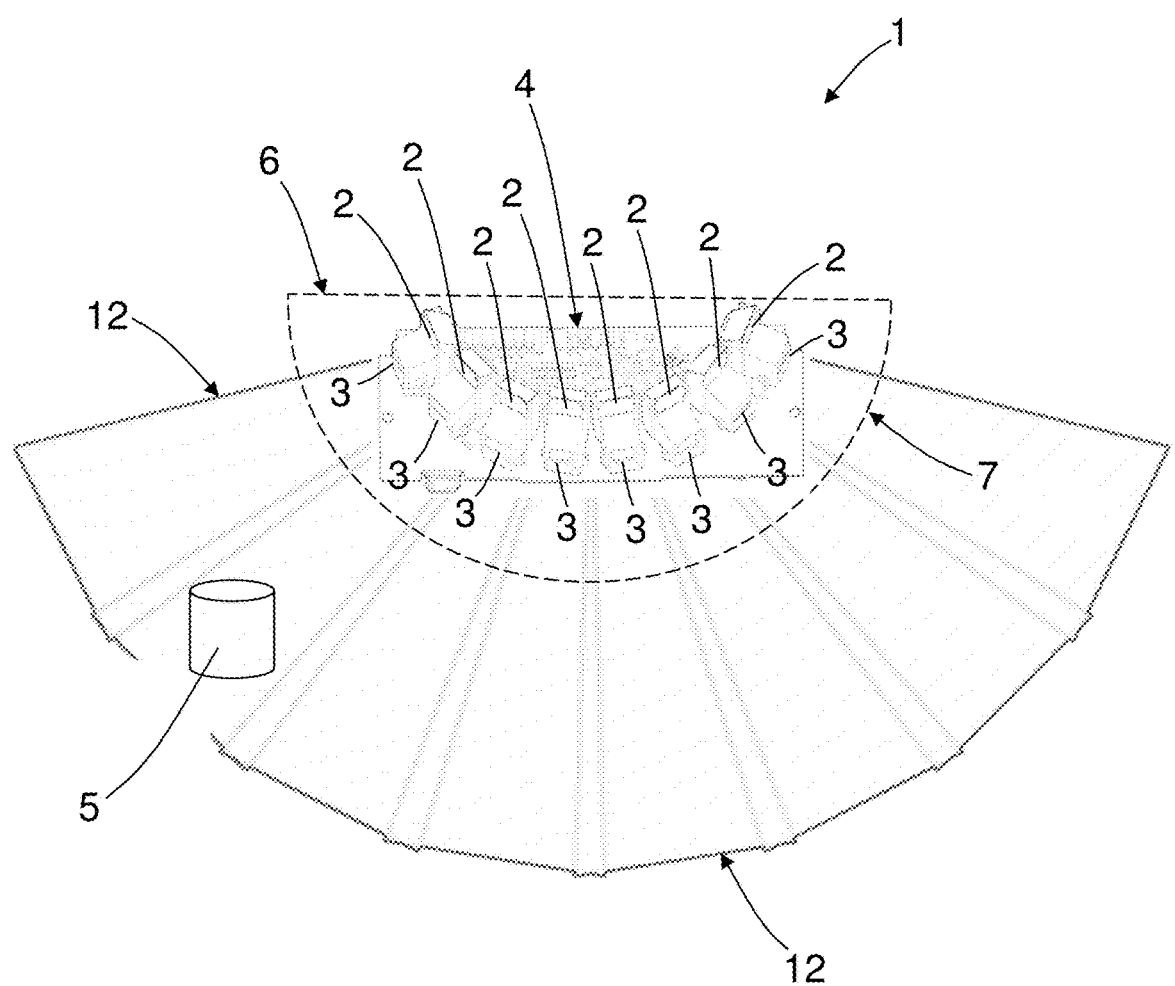

In accordance with FIG. 1, the light beams are transmitted or received in the manner of a fan in different angular directions, whereby a monitored zone can be simply examined as to whether objects 5 are present in the monitored zone or not and at which point, i.e. at which distance, the objects 5 are present. The objects 5 can furthermore be measured or a surrounding contour and its change can be detected. The monitored zone is monitored within a fan-like plane by the fan-like transmission of the light beams or by the fan-like reception. The transmission elements or reception elements are arranged, for example, radially symmetrically approximately in the periphery of a cylinder.

Figure 7:
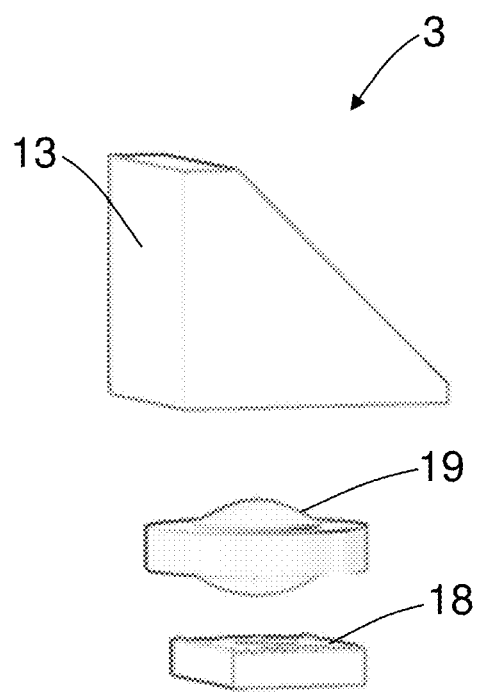
Figure 8:
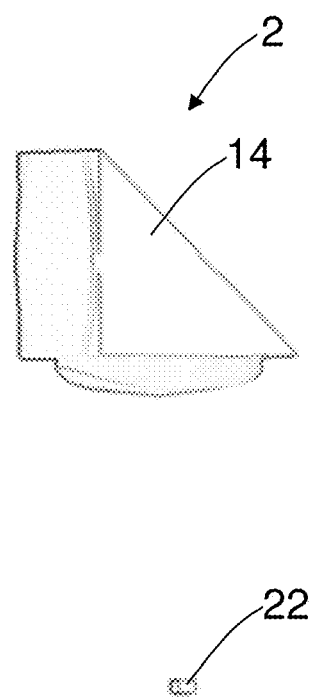

In accordance with FIG. 8, a deflection prism 14 is arranged in front of every transmission element 22 of the light transmitter 2 and/or in accordance with FIG. 7, a deflection prism 13 is arranged in front of every reception array 18, with the light beams being deflected due to total reflection.

In accordance with FIG. 7 and FIG. 8, at least one deflection optics. for example, comprises a deflection prism 13, 14 having a boundary surface whose surface normal has an angle of inclination to the main sensor direction, said angle of inclination amounting to half the deflection angle.

Such a deflection prism 13, 14 can in the simplest case be implemented by a body comprising e.g. a plastic and having the cross-section of an isosceles and right angle triangle, with the two surfaces that stand perpendicular on one another forming the entry and exit surfaces. The third surface serves as a reflective boundary surface, with incident light at an angle that is greater than the boundary angle of the total reflection being totally reflected.

In accordance with FIG. 7 and FIG. 8, the light passage surface is a surface standing perpendicular on the optical axes of the transmitter and of the receiver so that the boundary surface of the deflection prism 13, 14 forms an angle with the light passage surface that amounts to half the deflection angle.

In accordance with FIG. 8 the deflection prism 14 has at least one integrated lens, whereby a single-piece prism lens body is formed.

At least one of the deflection optics or one of the deflection prisms 14 is thus formed exclusively by a prism. In other words, with this deflection prism 14, no further optical components are present for the beam deflection except for the prism.

The integrated lens is preferably a converging lens.

For example, the integrated lens of the deflection prism is a free form lens.

The beam guidance can thus be individually set. The free-form lens has an optically effective free-form surface here. An individual beam guidance or bundling can thus be implemented.

Figure 9:
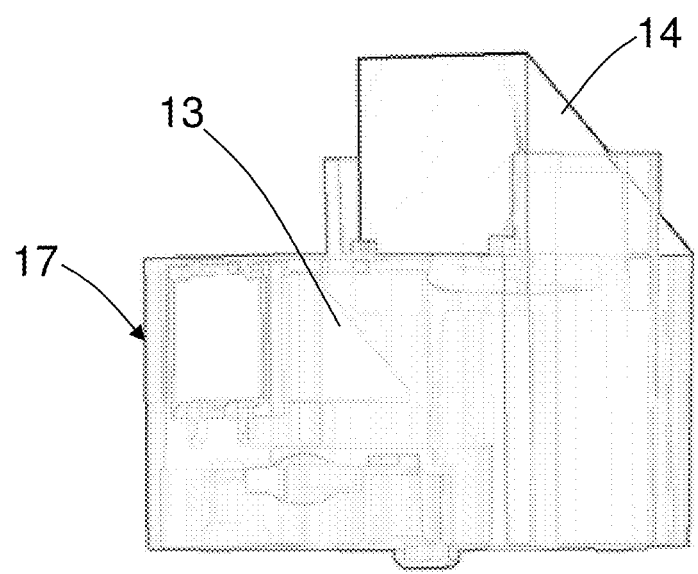

In accordance with FIG. 9, the light transmitter 2, the light receiver 3, and the respective associated deflection prisms 14, 13 are arranged in a common holding device 17, with the holding device 17 forming respective optically separate tubes for the transmission light path and for the reception light path.

Figure 10:
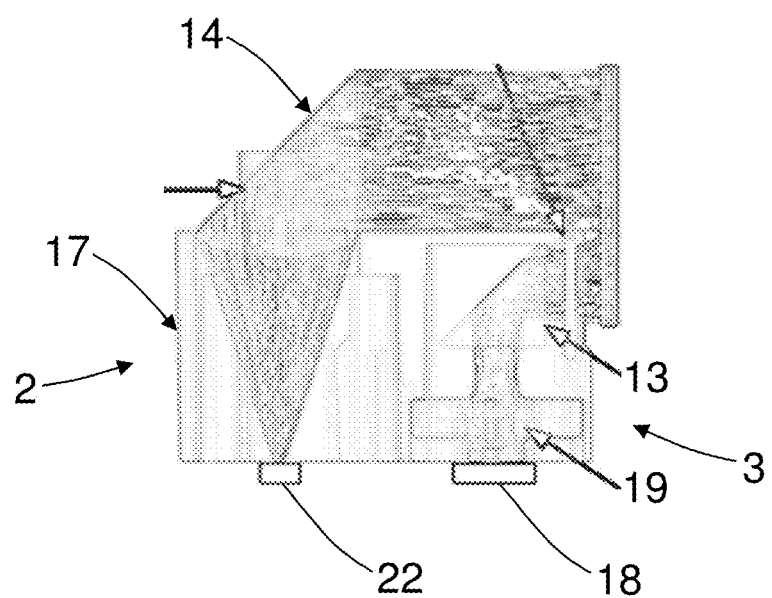

FIG. 10 shows the light beams of the transmission element 22 of the light transmitter 2 via the deflection prism 14 and the received light beams via the deflection prism 13 on the converging lens 19 and on the reception array 18.

Figure 2:
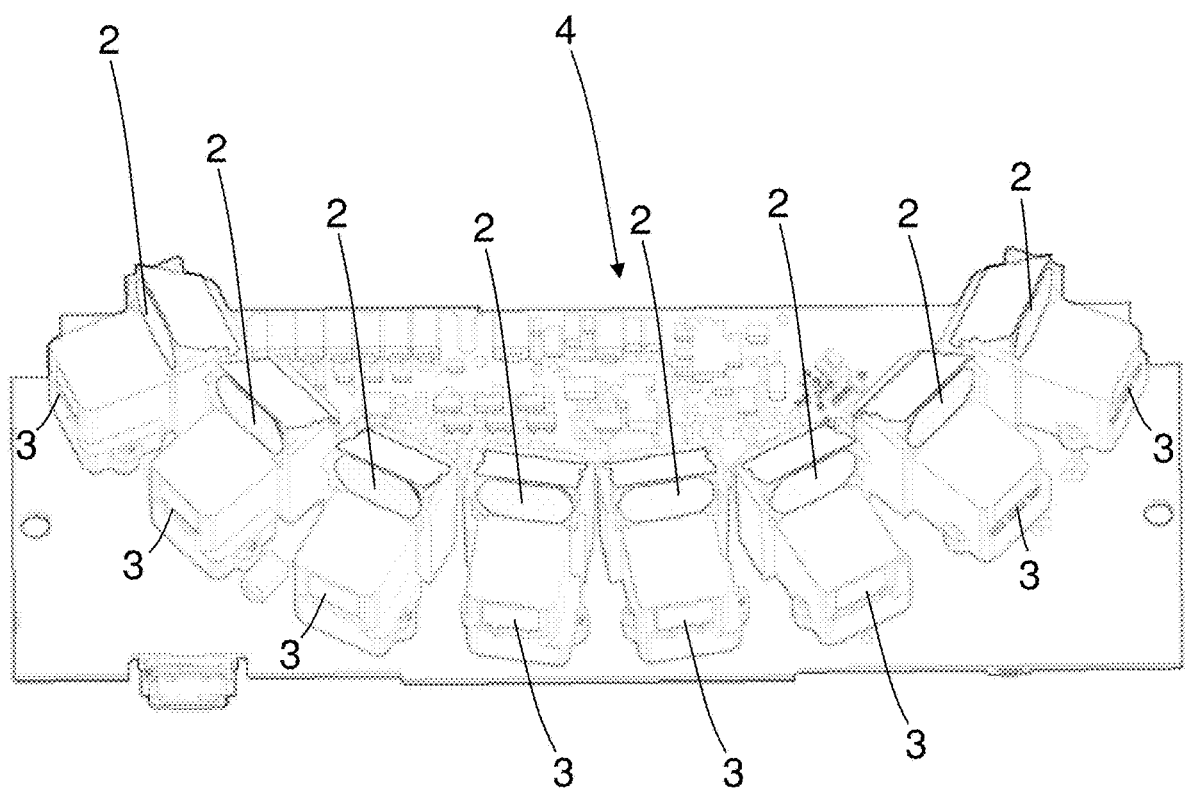
Figure 3:
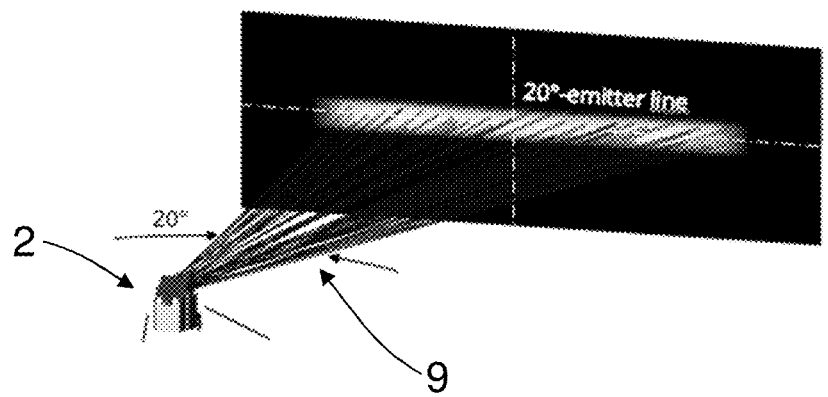
FIG. 3 shows the illumination line 9 having an angular width of 20 degrees.
Figure 4:
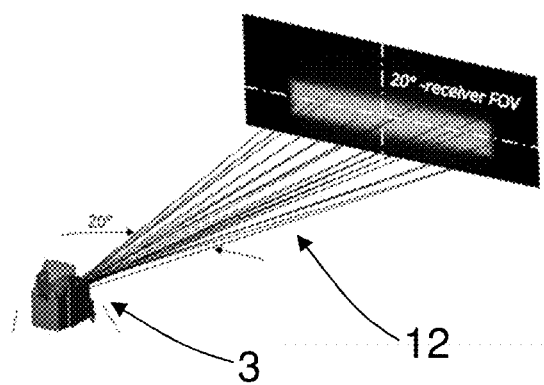
FIG. 4 shows a linear reception zone having an angular width of 20 degrees.
Figure 5:
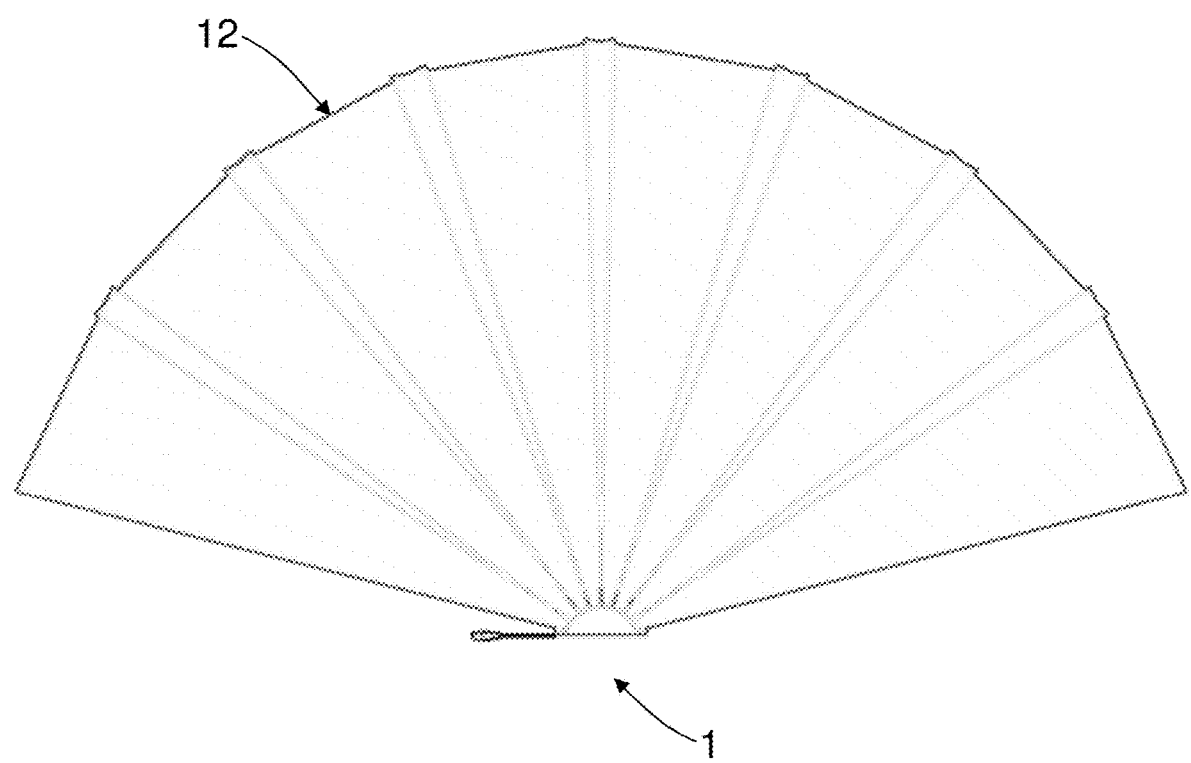
FIG. 5 shows the laser scanner 1 having the protected field 12.
Figure 6:
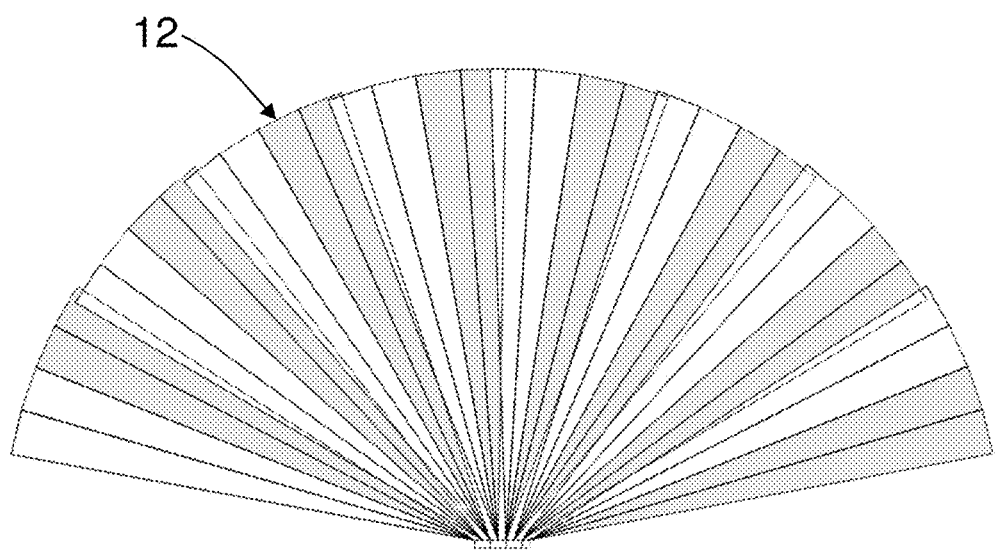
FIG. 6 shows a protected field that is formed by a plurality of angular segment-like part protected fields.

In accordance with FIG. 1 and FIG. 2, a plurality of holding devices 17 are arranged in the form of a segment of a circle, in arcuate form, or along a curved line in a common housing 6.

The holding device 17 forms a mechanically fixed arrangement of light transmitters 2 and light receivers 3. The holding device 17 here forms respective tubes for the transmission light path and for the reception light path. These paths are optically separated by the holding device 17 so that the transmitted transmission light cannot influence the received reception light.

In accordance with FIG. 7, a converging lens 19 is arranged between the reception array 18 and the deflection prism 13 of the light receiver 3. The light can thereby be focused on the reception array 18 after exiting the deflection prism 13. The focusing can in particular be set independently by the converging lens 19 if different receiver arrays are used from a construction aspect with an identical deflection prism 14.

The reception elements of the reception array 18 are preferably respectively single-photon avalanche diodes.

The light receivers 3 and/or the control and evaluation unit 4 is/are preferably configured to receive a light signal respectively after one another by a light reception element. The light receiver 3 is therefore operated sequentially. Light reception elements that are each just not next in line are preferably not only not read, but are also switched inactive. Extraneous light events or dark events thereby also do not occur by which the light reception element is still in dead time when it is then switched active. In addition, it reduces the power consumption of the light receiver 3.

It is conversely also possible to use a plurality of time of flight measurement units for the same light reception element. This is particularly sensible in the case of SPADs because a light reception element then preferably has a plurality of SPADs as subpixels. These SPADs can then deliver a plurality of times of flight per light reception element individually or group-wise. The evaluation of such SPADs acting as subpixels is, however, also conceivable together with only one time of flight measurement unit by means of a summarizing logic.

The control and evaluation unit 4 is preferably configured to measure times of flight multiple times by measurement repetition and/or separate evaluation of a plurality of received signals of a light reception element. Every distance value is then based on a plurality of individual measurements, which in particular produces better measurement results in the case of large ranges, high extraneous light loads, and a generally poor signal-to-noise ratio. Measurement repetition means that a further light pulse is transmitted and received again. Additional time of flight measurements cannot only be acquired over time, but also in that the individual light reception elements have a plurality of subpixels from which received signals of a plurality of times of flight can be determined. This multiple evaluation should not be confused with the respective evaluation of the light reception elements that additionally takes place for a spatial resolution over the light receivers. It is here a question of acquiring a plurality of measured values for the time of flight for the same location with the aid of subpixels. The measurement accuracy is also very generally increased by multiple measurement; however, this is particularly advantageous with SPADs because individual measurements can be due to a dark or extraneous light event and thus not only deviate by a certain noise tolerance, as with other light reception elements, but also do not correspond to the desired time of flight at all.

The control and evaluation unit 4 is preferably configured to accumulate a plurality of measured times of flight in a histogram in accordance with FIG. 16 in whose bins a count is made of how often a time of flight was measured in a specific time of flight range. The histogram divides the time of flight range of interest from zero up to the maximum range or a partial range thereof in preferably uniform bins and counts how often a time of flight respectively occurring in the bin was measured. The width of the bins is inter alia selected with reference to the desired temporal resolution and the memory present. The plurality of times of flight arise over time by measurement repetition with a respective further transmitted light pulse and/or by the multiple evaluation of subpixels of a light reception element. Statistical evaluations of the multiple measurement for determining a more exact time of flight are simply possible with a histogram.

In accordance with FIG. 12, a partial selection of reception elements of the reception array 18 are preferably combined to form contiguous evaluation groups 21, with only the evaluation groups 21 for evaluating a time of flight and for generating an object determination signal being used.

Four rectangular evaluation groups 21 that are arranged in a row are formed, for example.

Figure 13:
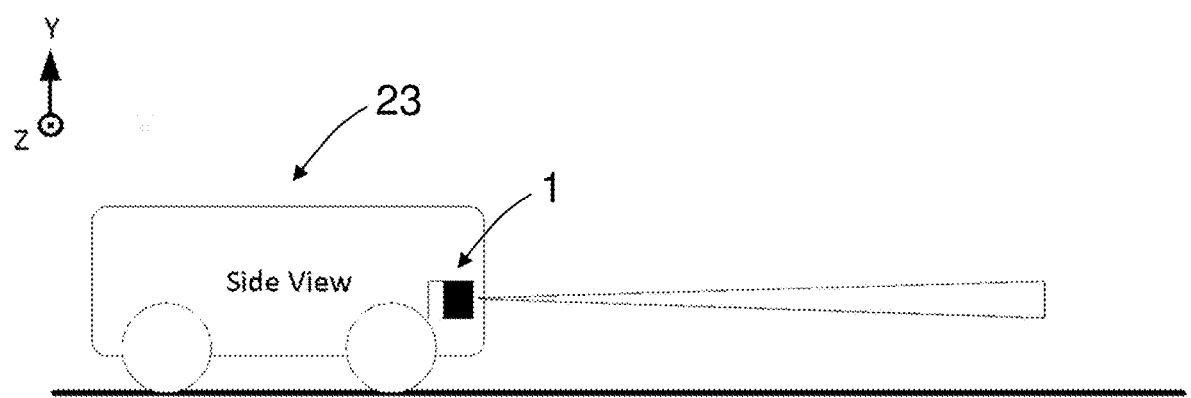
Figure 14:
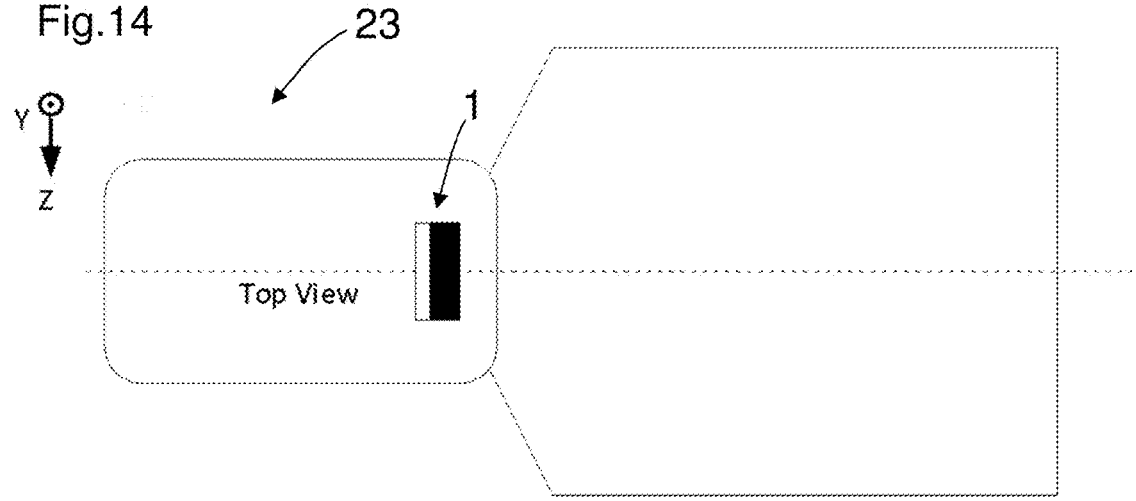
Figure 15:
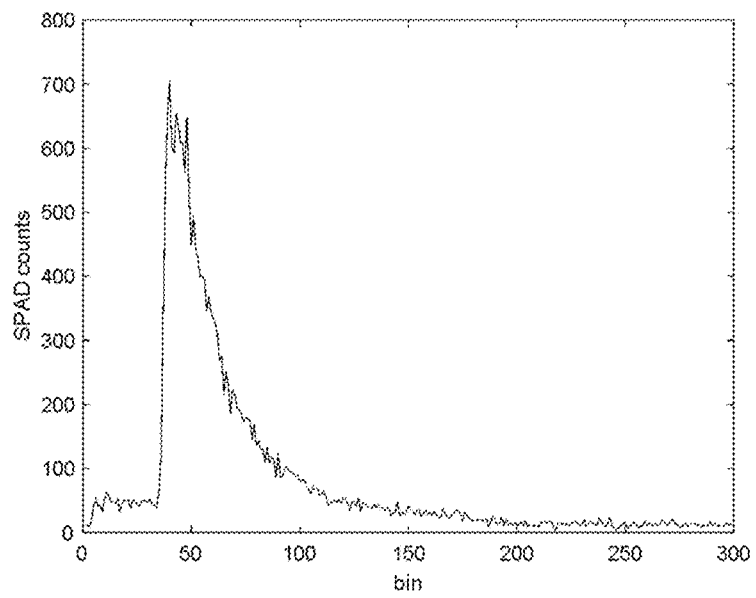

FIG. 13 and FIG. 14 each show an autonomous vehicle 23 with a laser scanner 1.

Figure 11:
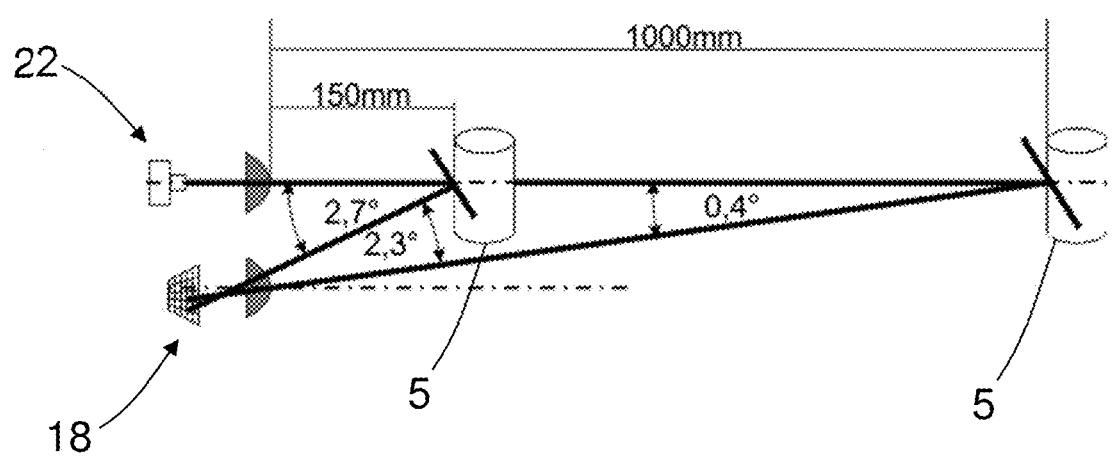

In accordance with FIG. 11, a respective light transmitter 2 and a respective light receiver 3 are arranged spaced apart from one another so that a triangulation arrangement is formed, with only some of the reflected light of an object 5 being incident on the light receiver 3 in a near field.

The intensity normally increases quadratically the smaller the distance is between the object 5 and the light receiver 3. To prevent the light receiver 3 from being overcontrolled, the optics of the light receiver 3 is adapted such that the reflection of the illumination line is not completely imaged on the light receiver 3 or on the reception array 18 at small object distances. This is due to the fact that the transmitted beam of the light transmitter 2 runs offset from the received beam. Provision is furthermore made, for example: that the object 5 is also imaged a little "blurred" at small distances, whereby the intensity of the received light on the light receiver 3 is further reduced.

Since all the light is not incident on the active surface of the light receiver 3 in the near zone, that is not on all the pixels of the reception array 18 that are actually evaluated, the intensity range on the light receiver 3 is reduced.

The measurement accuracy is thereby increased as long as the light receiver 3 is not overcontrolled.

The signal intensity is reduced at small distances between the TOF transceiver and the measured object 5. The dynamic range the TOF sensor has to be able to read is thereby reduced.

The optical "centers" of the transmitted and received beams are not concentric, for example. Instead, the distance of the two axes from one another and/or the angle to one another and the focal length of the optical lenses are selected, for example, such that objects located in the near zone of the sensor are only partly imaged on the part of the active surface of the SPAD array 18 and are actively read.

For example, only a part, in particular a small part, of the active surface of the TOF chip or of the reception array 18 is read during the distance measurement.

I.e. an object in the near zone is not necessarily imaged outside the optically active surface of the SPAD chip. It is sufficient if some of the photons are incident on the SPADs that are not read at this point. The size of the optically illuminated surface of the light transmitter 2 and of the active pixels on the SAPD reception array 18 thus also has an influence on this effect.

A measurement of the environmental light is provided for example.

The light receiver or part regions of the SPAD reception array already start to measure earlier than the light needs to arrive. I.e. the SPADs or single-photon avalanche diodes are switched active briefly before the 1st photon of the transmitted pulse has reached the receiver. Only environmental light and/or light from light transmitters of the same design can therefore arrive at the selected part zone or zones in this time. The light intensity is evaluated. If it is too high, the sensor switches into an error state since too much environmental light results in a dazzling of the sensor so that no SPADs or single-photon avalanche diodes remain to detect the photons that are reflected from the object to be measured.

A so-called pile-up effect is evaluated, for example. A measurement accuracy is thereby increased since the error that the extraneous light causes is thus reduced.

A single-photon avalanche diode or a SPAD can be activated only once per measurement cycle. If environmental light distributed homogeneously in time is incident on the light receiver 3, it slowly activates all the SPADs. This error is similar to a decaying e function and is removed from a formed histogram by calculation before a filter of the control and evaluation unit 4 is used by which the data are treated such that the distance from the first object 5 in the protected field 12 can be sought by a maximum search.

The correction takes place in that the values in the histogram in accordance with FIG. 16 are multiplied in dependence on their time order by an inverse E function whose parameters were fixed by experiment, for example.

Because the function is an inverse e function, its effect is disproportionately large in the front region of the histogram. That is exactly where the effect by the accidentally activated SPADs is the greatest. The effect and the correction by the e function is smaller further to the rear, that is later in time after the start of an individual measurement.

For example, reception elements are evaluated on which no transmitted light is incident.

It is thus ensured that an addressing of the pixels works properly.

The SPADs, single-photon avalanche diodes, or pixels of the reception array 18 are read that are not read during normal reception operation, that is, for example, pixels that are arranged around the active reception zone. These pixels are evaluated, and indeed in a time period in which the light transmitter 2, in particular a laser, is just not activated. The control and evaluation unit 4 has the expectation that the SPADs in this zone are not activated since they are actually not illuminated. If a signal nevertheless arrives here, the control and evaluation unit 4 knows that something is wrong with the addressing of the pixels, that is the control and evaluation unit 4 reads incorrect pixels. If this is the case, the control and evaluation unit 4 switches into an error state. The light transmitter 2 is switched off at this time.

REFERENCE NUMERALS 1 laser scanner
2 light transmitter
3 light receiver
4 control and evaluation unit
5 object
6 housing
7 front screen
9 illumination line
10 connected illumination line
11 linear reception zone
12 protected field
13 deflection prism of the light receiver
14 deflection prism of the light transmitter
17 holding device
18 reception array
19 converging lens
21 evaluation group
22 transmission element
23 autonomous vehicle

The invention claimed is:

1. A laser scanner having a plurality of light transmitters and a plurality of light receivers as well as a control and evaluation unit for evaluating the time of flight of light beams from the light transmitters via an object to the light receivers, wherein a plurality of light transmitters and a plurality of light receivers are each arranged in the form of a segment of a circle, in arcuate form, or along a curved line in a common housing, wherein the light beams are transmitted and received in different angular directions in the manner of a fan through a convex front screen at an outer side of the housing, wherein the distances of the transmitted light beams of the light transmitters increase as the distance from the laser scanner increases and/or the distances of the received light beams of the light receivers decrease as the distance from the laser scanner decreases, wherein the optical axes of the light transmitters and of the light receivers are spaced apart from one another, and wherein the light transmitters are configured to respectively generate an illumination line, with the light receivers being configured to respectively form a linear reception zone, wherein a respective deflection prism is associated with at least one of each light transmitter and each light receiver, with the light beams being deflected on the basis of total reflection, and wherein the deflection prism has at least one integrated lens, whereby a single-piece prism lens body is formed.

2. The laser scanner in accordance with claim 1, wherein the light receiver has a reception array.

3. The laser scanner in accordance with claim 1, wherein the integrated lens of the deflection prism is a free-form lens.

4. The laser scanner in accordance with claim 1, wherein the light transmitter, the light receiver, and the respective associated deflection prisms are arranged in a common holding device, with the holding device for the transmission light path and for the reception light path each forming optically separate tubes, with a plurality of holding devices being arranged in the form of a segment of a circle, in arcuate form, or along a curved line in a common housing.

5. The laser scanner in accordance with claim 1, wherein a converging lens is arranged between the reception array and the deflection prism of the light receiver.

6. The laser scanner in accordance with claim 2, wherein the reception elements of the reception array are each single-photon avalanche diodes.

7. The laser scanner in accordance with claim 2, wherein a partial selection of reception elements of the reception array are combined to form contiguous evaluation groups, with only the evaluation groups for evaluating a time of flight and for generating an object determination signal being used.

8. The laser scanner in accordance with claim 1, wherein a respective light transmitter and a respective light receiver are arranged spaced apart from one another so that a triangulation arrangement is formed, with only some of the reflected light of an object being incident on at least one of the light receiver and evaluation groups in a near field.

9. The laser scanner in accordance with claim 1, wherein each one of:
  a) a first deflection prism, associated with a first light transmitter of the plurality of light transmitters; and
  b) a second deflection prism, associated with a first light receiver of the plurality of light receivers,
  includes:
  a first light entry surface;
  a second light exit surface; and
  a third reflective boundary surface.

10. The laser scanner in accordance with claim 8, wherein the first deflection prism includes a first metal layer at the third reflective boundary surface thereof; and
  wherein the second deflection prism includes a second metal layer at the third reflective boundary surface thereof.

* * * * *